(12) United States Patent
Hsieh

(10) Patent No.: US 11,584,339 B2
(45) Date of Patent: Feb. 21, 2023

(54) PLUG-TYPE DRIVER ASSISTANCE DEVICE

(71) Applicant: Savvy Energy Vetronics Technology Integration Co. Ltd., New Taipei (TW)

(72) Inventor: Feng-Chi Hsieh, New Taipei (TW)

(73) Assignee: SAVVY ENERGY VETRONICS TECHNOLOGY INTEGRATION CO. LTD., New Taipei (TW)

( * ) Notice: Subject to any disclaimer, the term of this patent is extended or adjusted under 35 U.S.C. 154(b) by 587 days.

(21) Appl. No.: 16/725,543

(22) Filed: Dec. 23, 2019

(65) Prior Publication Data

US 2020/0282962 A1 Sep. 10, 2020

(30) Foreign Application Priority Data

Mar. 8, 2019 (TW) .................................. 108107927
Mar. 8, 2019 (TW) .................................. 108202848

(51) Int. Cl.
| | | |
|---|---|---|
| *B60T 7/00* | (2006.01) | |
| *B60T 7/22* | (2006.01) | |
| *B60W 30/09* | (2012.01) | |
| *B60W 10/18* | (2012.01) | |

(Continued)

(52) U.S. Cl.
CPC .............. *B60T 7/22* (2013.01); *B60T 8/4872* (2013.01); *B60T 13/686* (2013.01); *B60W 10/18* (2013.01); *B60W 30/09* (2013.01); *B60T 2201/022* (2013.01); *B60W 2540/12* (2013.01)

(58) Field of Classification Search
CPC ........ B60T 7/22; B60T 8/4872; B60T 13/686; B60T 2201/022; B60W 10/18; B60W 30/09; B60W 2540/12
See application file for complete search history.

(56) References Cited

U.S. PATENT DOCUMENTS

| | | |
|---|---|---|
| 2016/0004254 A1 | 1/2016 | Matsumoto et al. |
| 2017/0267234 A1* | 9/2017 | Kemp .................... G08G 1/165 |
| 2017/0361840 A1* | 12/2017 | Valentine ............ B60W 30/143 |

(Continued)

FOREIGN PATENT DOCUMENTS

| | | |
|---|---|---|
| CN | 101823435 A | 9/2010 |
| CN | 101875348 A | 11/2010 |

(Continued)

*Primary Examiner* — Truc M Do
(74) *Attorney, Agent, or Firm* — McClure, Qualey & Rodack, LLP

(57) ABSTRACT

A plug-type driver assistance device includes an external brake module and an auxiliary control module. The external brake module includes a hydraulic pump and a control valve group, the control valve group includes an inlet valve and an outlet valve, and the hydraulic pump is connected between the inlet valve and the outlet valve. The auxiliary control module includes a receiving unit, a processing unit and an output unit. The processing unit selectively switches to the original vehicle control mode or the assist driving mode. The original vehicle control mode means that the processing unit receives the accelerator pedal signal and controls the output unit to output the accelerator pedal signal. The assist driving mode means that the processing unit receives the surrounding information of the vehicle, and generates an analog pedal signal and an analog braking signal.

11 Claims, 7 Drawing Sheets

(51) Int. Cl.
*B60T 13/68* (2006.01)
*B60T 8/48* (2006.01)

(56) References Cited

U.S. PATENT DOCUMENTS

2018/0236984 A1* 8/2018 Gomes .................... B60T 8/263
2018/0339685 A1* 11/2018 Hill ....................... B60T 13/662

FOREIGN PATENT DOCUMENTS

| | | |
|---|---|---|
| CN | 103786700 A | 5/2014 |
| CN | 104554213 A | 4/2015 |
| CN | 104590274 A | 5/2015 |
| CN | 105035048 A | 11/2015 |
| CN | 106740436 A | 5/2017 |
| CN | 109249806 A | 1/2019 |
| JP | 2007099237 A | 4/2007 |

* cited by examiner

PLUG-TYPE DRIVER ASSISTANCE DEVICE

CROSS-REFERENCES TO RELATED APPLICATIONS

This non-provisional application claims priority under 35 U.S.C. § 119(a) to Patent Application No. 108107927 and 108202848, filed in Taiwan, R.O.C. on Mar. 8, 2019, the entire contents of which are hereby incorporated by reference.

BACKGROUND

Technical Field

The instant disclosure relates to a driver assistance device, and in particular, to a plug-type driver assistance device.

Related Art

For a long time, many traffic accidents occurring during driving a vehicle are mostly caused by the following factors. One factor is negligence of a driver, for example, a driver is not concentrated, is tired or fails to maintain a safety distance between vehicles. The other factor is a blind spot caused by a vehicle structure. For example, when a driver is driving a vehicle, a pillar A of the vehicle easily blocks a pedestrian, a vehicle, or a traffic sign in front, causing a traffic accident, and a pillar B of the vehicle easily prevents object on a side of the vehicle from moving, causing the driver to easily collide with an object on a side of the vehicle.

With the development of science and technology, most new cars launched by automakers carry a driver assistance system, to reduce burden of the drive when driving and improve driving safety, thereby reducing occurrence of a traffic accident. However, if a driver using an old vehicle engine system is intended to use a driver assistance system, it is necessary to change a new car or replace the old vehicle engine system with a new vehicle engine system compatible with the driver assistance system.

SUMMARY

In view of the above, in an embodiment, a plug-type driver assistance device is provided, including an external brake module and an auxiliary control module, the external brake module including a hydraulic pump and a control valve group, the control valve group including an inlet valve and an outlet valve, and the hydraulic pump being in communication between the inlet valve and the outlet valve. An auxiliary control module includes a receiving unit, a processing unit, and an output unit, the processing unit being electrically connected to the receiving unit and the output unit, the output unit being electrically connected to the external brake module, the receiving unit receiving a switching signal, and the processing unit selectively switching to an original vehicle control mode or an assist driving mode according to the switching signal; the original vehicle control mode meaning that the processing unit receives an accelerator pedal signal via the receiving unit and controls the output unit to output the accelerator pedal signal, and the assist driving mode meaning that the processing unit receives surrounding information of a vehicle via the receiving unit and generates an analog pedal signal and an analog braking signal through processing, and the processing unit controls the output unit to output the analog pedal signal and the analog braking signal, where the analog braking signal controls opening or closing of the inlet valve and the outlet valve.

In another embodiment, a plug-type driver assistance device is provided, including an external brake module and an auxiliary control module. An external braking module includes a control valve group, the control valve group including an air pressure valve. An auxiliary control module includes a receiving unit, a processing unit, and an output unit, the processing unit being electrically connected to the receiving unit and the output unit, the output unit being electrically connected to the external brake module, the receiving unit receiving a switching signal, and the processing unit selectively switching to an original vehicle control mode or an assist driving mode according to the switching signal; the original vehicle control mode meaning that the processing unit receives an accelerator pedal signal via the receiving unit and controls the output unit to output the accelerator pedal signal, and the assist driving mode meaning that the processing unit receives surrounding information of a vehicle via the receiving unit and generates an analog pedal signal and an analog braking signal through processing, and the processing unit controls the output unit to output the analog pedal signal and the analog braking signal, where the analog braking signal controls opening or closing of the air pressure valve.

As above, according to the plug-type driver assistance device of the embodiments of the instant disclosure, when switching to the assist driving mode, the processing unit of the auxiliary control module may generate the analog pedal signal and the analog braking signal according to the surrounding information of the vehicle, to actively control power output and braking of the vehicle. Therefore, the plug-type driver assistance device may be applicable to vehicle aftermarket installed products, so that all kinds of vehicles without an assist driving function can be easily installed and compatible, and the assist driving function may be implemented without replacing a new vehicle or replacing an original vehicle machine system, for example, an autonomous emergency braking (AEB) function, an adaptive cruise control (ACC) function, or a cross traffic assistance (CTA) function.

DETAILED DESCRIPTION

Figure 1:
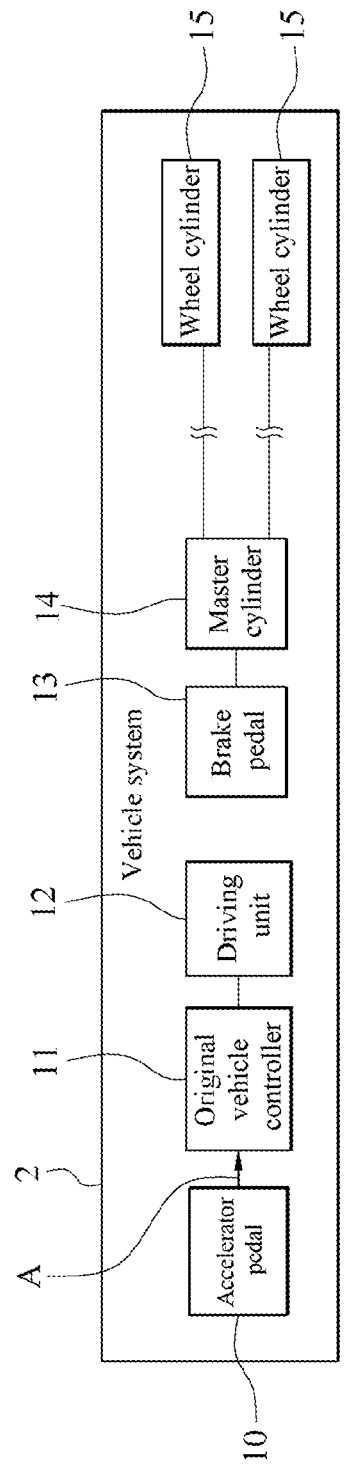
FIG. 1 illustrates a system architecture diagram of an embodiment of a known vehicle system.

FIG. 1 is a system architecture diagram of an embodiment of a known vehicle system. As shown in FIG. 1, a vehicle system 2 of this embodiment is a vehicle control system generally without an assist driving function. The vehicle system 2 has an accelerator control system and a hydraulic brake system. The accelerator control system includes an accelerator pedal 10, an original vehicle controller (engine control unit, ECU) 11, and a driving unit 12 (such as an engine or a motor), and the hydraulic brake system includes a brake pedal 13, a master cylinder 14, and a plurality of wheel cylinders 15 (two wheel cylinders 15 are used as an example herein, but a quantity of wheel cylinders 15 is not limited). An anti-lock brake system (ABS) module, a vehicle stability control (VSC) module, a brake force distributor, or a combination thereof may be disposed between the master cylinder 14 and the plurality of wheel cylinders 15 according to different vehicles models or types, which is omitted in the figure.

As shown in FIG. 1, the original vehicle controller 11 is connected between the accelerator pedal 10 and the driving unit 12. In an embodiment, the accelerator pedal 10 may be an electronic accelerator pedal, and when a driver depresses the accelerator pedal 10, an accelerator pedal signal A may be generated and transmitted to the original vehicle controller 11, where the accelerator pedal signal A corresponds to a change of a position of the accelerator pedal 10, and the original vehicle controller 11 may generate a control signal according to the accelerator pedal signal A to control power output of the driving unit 12. Therefore, the driver may control a vehicle to accelerate or decelerate by depressing the accelerator pedal 10. For example, when the driver depresses the accelerator pedal 10 deeper, corresponding power output of the driving unit 12 is greater (for example, when the driving unit 12 is an engine, the engine has a larger accelerator opening degree, or when the driving unit 12 is a motor, the motor has a larger torque, rotational speed, or power output), thereby improving a travelling speed of the vehicle.

In an embodiment, the accelerator pedal signal A may be, but is not limited to at least one voltage signal. The driving unit 12 as an engine is used as an example. A voltage signal that is generated when the driver depresses the accelerator pedal 10 may be between 0 V and 5 V. When the voltage signal is 5 V, the original vehicle controller 11 controls an accelerator opening degree of the driving unit 12 to be 100% according to a control signal generated by the voltage signal. When the voltage signal is 2.5 V, the original vehicle controller 11 controls an accelerator opening degree of the driving unit 12 to be 50% according to a control signal generated by the voltage signal. When the voltage signal is 0 V, the original vehicle controller 11 controls an accelerator opening degree of the driving unit 12 to be 0% according to a control signal generated by the voltage signal. In other words, different voltage signals correspond to different accelerator opening degrees. The foregoing embodiments are merely examples and are not intended to limit the instant disclosure. In another embodiment, if the driving unit 12 is a motor, different voltage signals correspond to different torques, rotational speeds, or power.

As shown in FIG. 1, the master cylinder 14 may be, but is not limited to an oil hydraulic pump, and the master cylinder 14 is connected between the brake pedal 13 and the plurality of wheel cylinders 15. For example, the brake pedal 13, the master cylinder 14, and the plurality of wheel cylinders 15 may be connected through a pipeline. Therefore, when the driver depresses the brake pedal 13, a piston in the master cylinder 14 may be driven to operate to compress liquid (for example, brake oil) inside the master cylinder, so that the liquid is pressurized and flows to the wheel cylinders 15 through the pipeline, thereby further achieving a braking effect through a hydraulic pressure. For example, the hydraulic pressure drives a brake shoe to actuate to press against a brake drum to achieve the braking effect (which is omitted in the figure). When the driver depresses the brake pedal 13 deeper, a higher hydraulic pressure is generated, thereby generating stronger braking force.

Figure 2:
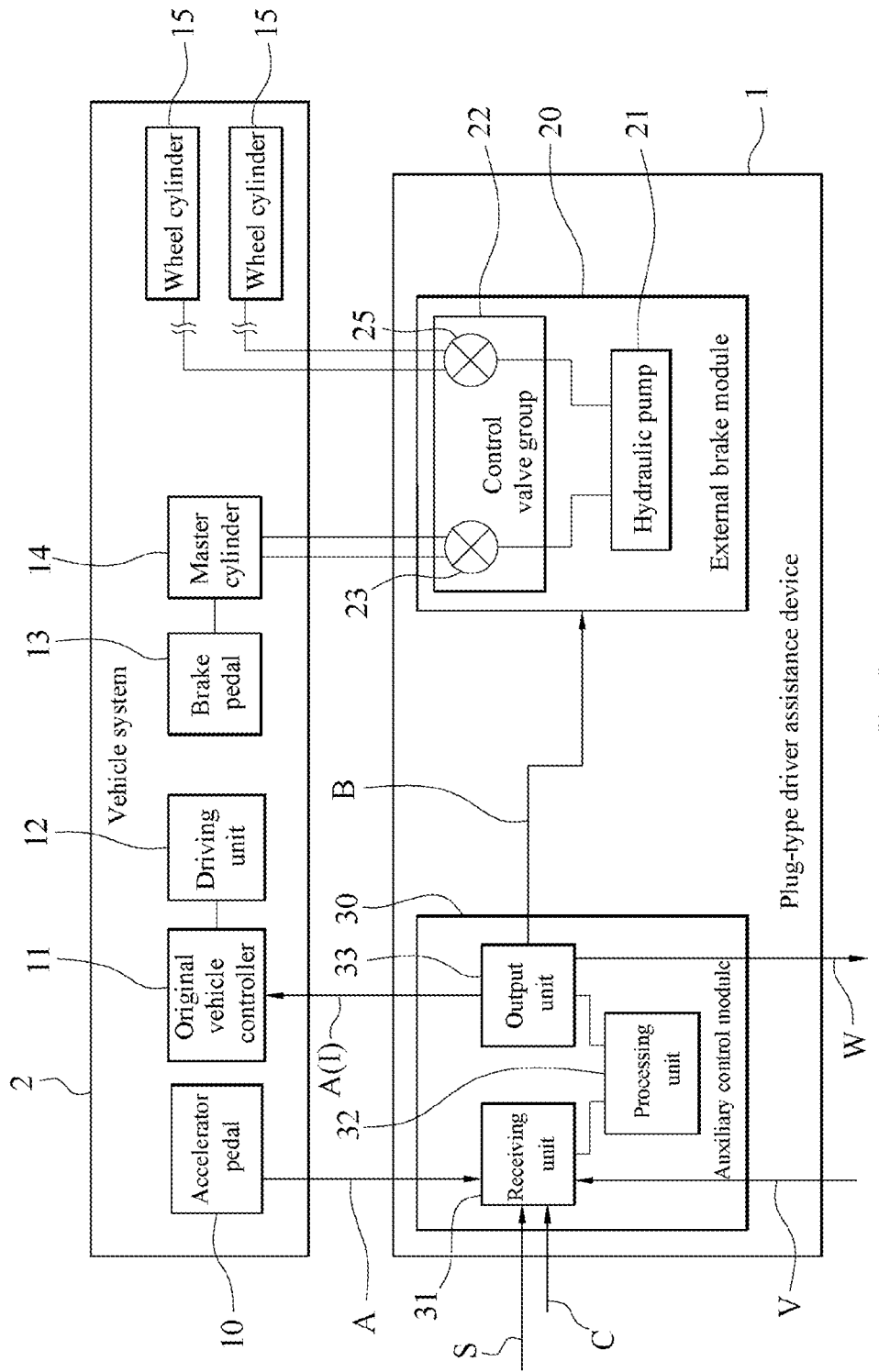
FIG. 2 illustrates a schematic diagram illustrating aftermarket installation of an embodiment of a plug-type driver assistance device according to the instant disclosure.

FIG. 2 is a schematic diagram illustrating aftermarket installation of an embodiment of a plug-type driver assistance device according to the instant disclosure. As shown in FIG. 2, the plug-type driver assistance device 1 in this embodiment may be applicable to vehicle aftermarket installed products, to install a vehicle system 2 compatible with all types of vehicles without an assist driving function, so that the vehicles have the assist driving function.

As shown in FIG. 2, the plug-type driver assistance device 1 of this embodiment includes an external brake module 20 and an auxiliary control module 30. In an installation process, the auxiliary control module 30 of the external brake module 20 is connected between the accelerator pedal 10 of an original vehicle system 2 and the original vehicle controller 11. In other words, the accelerator pedal 10 is not directly connected to the original vehicle controller 11, where the accelerator pedal 10, the original vehicle controller 11, and the auxiliary control module 30 may be connected to each other using a controller area network (CAN) to transmit a signal. Therefore, the accelerator pedal signal A that is generated when the driver depresses the accelerator pedal 10 is first transmitted to the auxiliary control module 30 rather than directly transmitted to the original vehicle controller 11.

As shown in FIG. 2, the external brake module 20 of the plug-type driver assistance device 1 is connected between the master cylinder 14 and the plurality of wheel cylinders 15 that are of the original vehicle system 2. In other words, the master cylinder 14 is not directly connected to the plurality of wheel cylinders 15, where the external brake module 20, the master cylinder 14, and the plurality of wheel cylinders 15 may be connected through the pipeline. For example, in this embodiment, the external brake module 20 includes a hydraulic pump 21 and a control valve group 22. The control valve group 22 includes at least one inlet valve 23 and at least one outlet valve 25, and the hydraulic pump 21 is in communication between the inlet valve 23 and the outlet valve 25. The master cylinder 14 may be in communication with the inlet valve 23 of the external brake module 20 through the pipeline, and the outlet valve 25 of the external brake module 20 may be in communication with the plurality of wheel cylinders 15 through the pipeline. In some embodiments, the inlet valve 23 and the outlet valve 25 may be a variety of valves that regulate flow, for example, a solenoid valve, a ball valve, or a plug valve, and the like.

Figure 3:
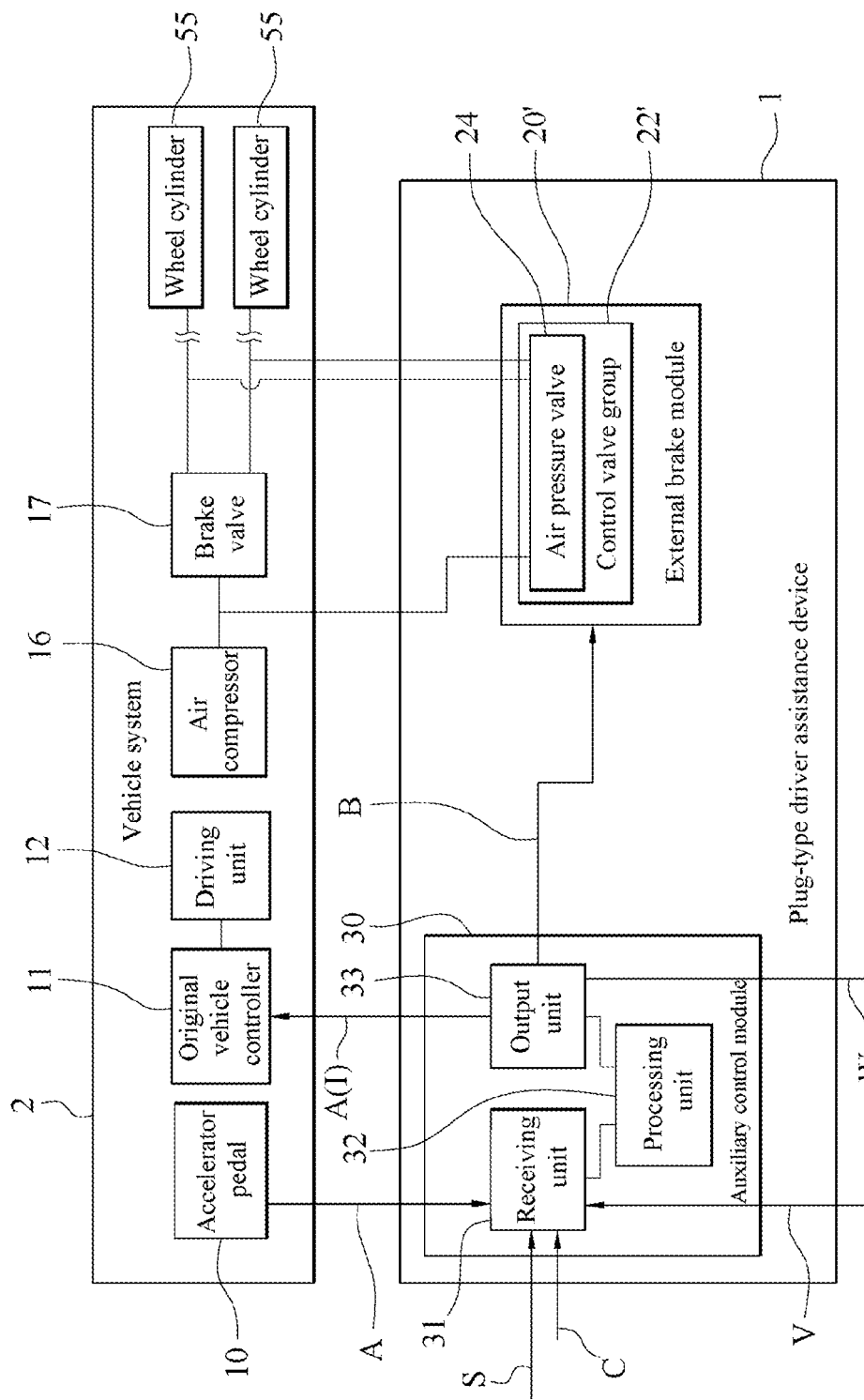
FIG. 3 illustrates a schematic diagram illustrating aftermarket installation of another embodiment of a plug-type driver assistance device according to the instant disclosure.

As shown in FIG. 3, in another embodiment, the brake system of the vehicle system 2 may also be an air pressure brake system. The air pressure brake system includes an air compressor 16, a brake valve 17 linked with the brake pedal, and a wheel cylinder 55. The brake valve 17 is in communication between the air compressor 16 and the wheel cylinder 55 through the pipeline, where the air compressor 16 may include a compressor and an air receiver, the air receiver being configured to store air compressed by the compressor. When the driver depresses the brake pedal, the brake valve 17 is linked to open, and the air stored in the air receiver of the air compressor 16 flows to each wheel cylinder 55 through the pipeline, thereby achieving a braking effect through the air pressure. When the driver depresses the brake pedal deeply, the brake valve 17 opens to a larger extent, a higher air pressure is generated, thereby generating stronger braking force.

As shown in FIG. 3, a difference between this embodiment and the embodiment of FIG. 2 is that a control valve group 22' of an external brake module 20' of this embodiment includes an air pressure valve 24. The air pressure valve 24 is connected, through the pipeline, to the air compressor 16 and each wheel cylinder 55 that are of the vehicle system 2, and the air pressure valve 24 and the brake valve 17 are disposed in parallel. Therefore, when the brake pedal is not pressed and the air pressure valve 24 is opened, the air stored in the air receiver of the air compressor 16 flows to each wheel cylinder 55 through the pipeline of the air pressure valve 24. In an embodiment, the brake valve 17 or the air pressure valve 24 may be a one-way valve, to prevent air pressure return being caused when both the brake valve 17 and the air pressure valve 24 are opened.

As shown in FIG. 2 and FIG. 3, the auxiliary control module 30 includes a receiving unit 31, a processing unit 32, and an output unit 33. The processing unit 32 is electrically connected to the receiving unit 31 and the output unit 33. The processing unit 32 may be a central processing unit (CPU), or other programmable microprocessors, digital signal processors (DSP), programmable controllers, and application specific integrated circuits (ASIC), a programmable logic device (PLD), or other similar devices, which are responsible for data operation of and logic determining. The receiving unit 31 and the output unit 33 may be implemented using a chip, a circuit block in the chip, a firmware circuit, and a circuit board containing several electronic components and wires.

As shown in FIG. 2 and FIG. 3, when the receiving unit 31 of the auxiliary control module 30 receives a switching signal S, the processing unit 32 may selectively switch to an original vehicle control mode or an assist driving mode according to the switching signal S. For example, the switching signal S may be a manual switching signal. For example, the receiving unit 31 may be connected to a start switch (not shown in the figure). When the driver turns on the start switch, that is, outputs the switching signal S to the receiving unit 31, the processing unit 32 may selectively switch to the original vehicle control mode or the assist driving mode according to the switching signal S. When the driver turns off the start switch, the processing unit 32 remains in the original vehicle control mode. The following describes the original vehicle control mode and the assist driving mode in detail, respectively.

As shown in FIG. 2, when being in the original vehicle control mode, the processing unit 32 receives the accelerator pedal signal A via the receiving unit 31, and controls the output unit 33 to directly output the accelerator pedal signal A. In other words, for the accelerator pedal signal A generated when the driver depresses the accelerator pedal 10, the processing unit 32 directly transmits the accelerator pedal signal A to the original vehicle controller 11 via the output unit 33, so that the original vehicle controller 11 may generate a control signal according to a change of a position of the accelerator pedal 10 the driver depresses, to control power output of the driving unit 12, and the processing unit 32 does not actively intervene in the power control of the driving unit 12. The accelerator pedal signal A as a voltage signal is used as an example. When a voltage signal generated when the driver depresses the accelerator pedal 10 is 2.5 V, the processing unit 32 directly transmits the voltage signal of 2.5 V to the original vehicle controller 11 via the output unit 33, to control the driving unit 12 to operate to generate corresponding power performance (for example, when the driving unit 12 is the engine, an accelerator of the engine is opened to a predetermined opening degree, or when the driving unit 12 is the motor, the motor runs at a predetermined rotational speed, torque, or power).

As shown in FIG. 2, when being in the assist driving mode, the processing unit 32 receives surrounding information V of the vehicle via the receiving unit 31 and generates an analog pedal signal I and an analog braking signal B through processing, and the processing unit 32 controls the output unit 33 to output the analog pedal signal I and the analog braking signal B. In other words, when being in the assist driving mode, the processing unit 32 does not directly transmit the accelerator pedal signal A to the original vehicle controller 11, but performs processing according to the surrounding information V of the vehicle to generate the analog pedal signal I and the analog braking signal B. The analog pedal signal I is transmitted to the original vehicle controller 11 via the output unit 33, to actively control power output of the driving unit 12. In the embodiment of FIG. 2, the analog braking signal B is output to the external brake module 20 to control opening or closing of the inlet valve 23 and the outlet valve 25, so that hydraulic brake control can be actively performed. In the embodiment of FIG. 3, the analog braking signal B is output to the external brake module 20' to control opening or closing of the air pressure valve 24, so that air pressure brake control can be actively performed. Therefore, the vehicle may have the assist driving function without replacing a new car or replacing an original vehicle engine system, such as an autonomous emergency braking (AEB) function, an adaptive cruise control (ACC) function, or a cross traffic assistance (CTA) function, which is described in detail as follows.

Figure 7:
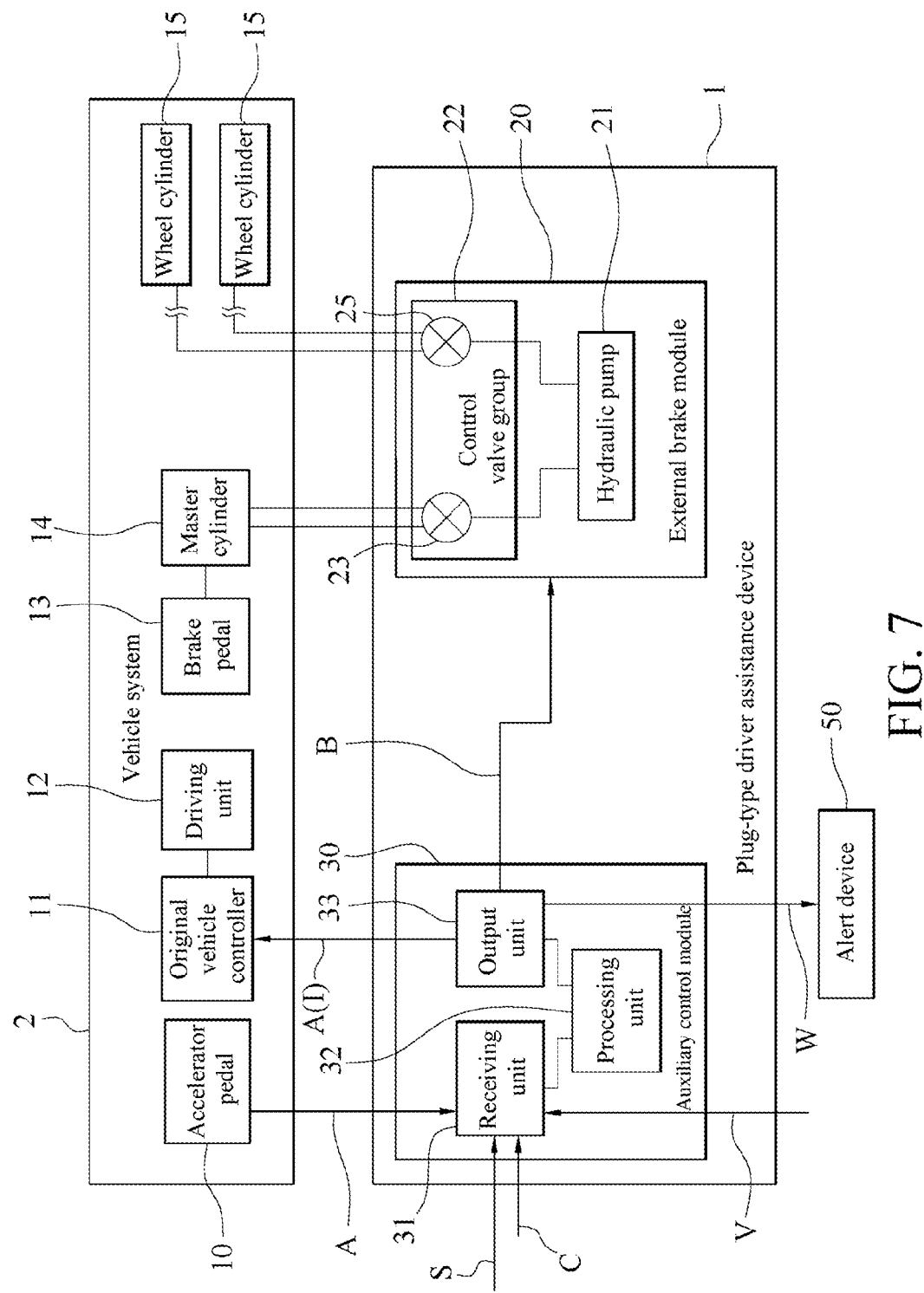
FIG. 7 illustrates a system architecture diagram of another embodiment of a plug-type driver assistance device according to the instant disclosure.

Carrying on with the foregoing, in some embodiments, the processing unit 32 in the assist driving mode may further control the output unit 33 to output an alert signal W to alert the driver, so as to ensure driving safety of the driver. For example, FIG. 7 is a system architecture diagram of another embodiment of a plug-type driver assistance device according to the instant disclosure. In this embodiment, the processing unit 32 in the assist driving mode may receive surrounding information V of the vehicle via the receiving unit 31 and generate an analog pedal signal I, an analog braking signal B, and an alert signal W through processing, and the processing unit 32 controls the output unit 33 to output the analog pedal signal I, the analog braking signal B, and the alert signal W. The alert signal W may be output to an alert device 50 (such as a display screen, a horn, or an alert light) to alert the driver by sending an alert message via the alert device 50. In some embodiments, the alert device 50 may be an in-vehicle alert device located in the original vehicle system 2, or the plug-type driver assistance device 1 may include the alert device 50 to be additionally installed in the vehicle system 2. In addition, the alert message may be a text signal, a sound signal, a light emitting signal, or a combination of at least two thereof depending on different alert devices 50.

Figure 4:
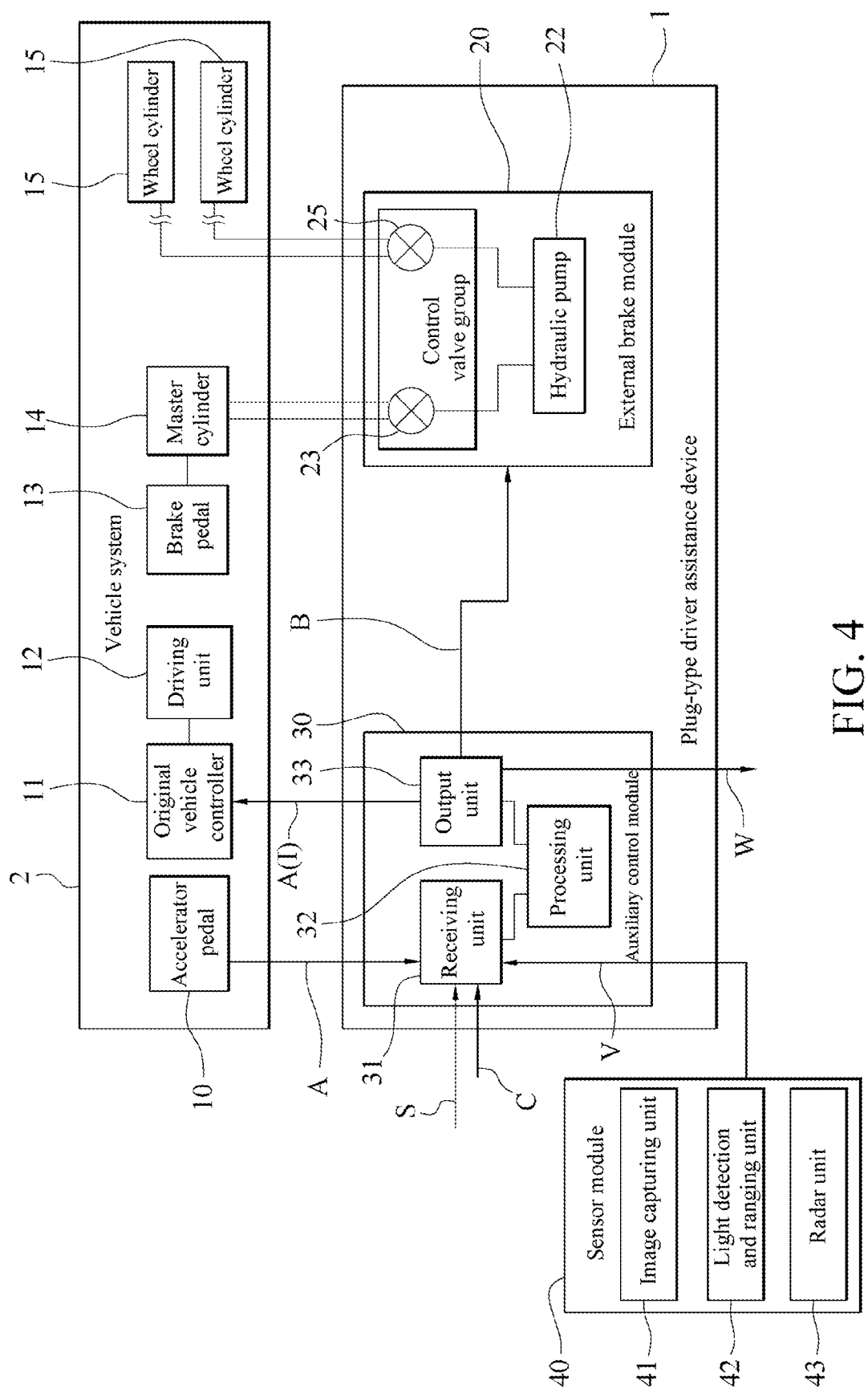
FIG. 4 illustrates a schematic diagram illustrating aftermarket installation of still another embodiment of a plug-type driver assistance device according to the instant disclosure.

In some embodiments, the surrounding information V of the vehicle is from a sensor module 40. As shown in FIG. 4, the sensor module 40 includes an image capturing unit 41, a light detection and ranging unit 42, a radar unit 43, or a combination of at least two units. For example, the image capturing unit 41 may include at least one lens mounted to the vehicle, for example, the image capturing unit 41 includes a plurality of lenses and installed in the front of the vehicle, on both sides of the vehicle, and in the rear of the vehicle, so as to capture images outside the vehicle such as in front of the vehicle, on both sides of the vehicle, and behind the vehicle. The light detection and ranging (LIDAR) unit 42 may be mounted to the top of the vehicle to emit a laser beam to scan surrounding environment of the vehicle to obtain point cloud information, so that a position of a surrounding object outside the vehicle can be obtained using the point cloud information. The radar unit 43 may be infrared radar, ultrasonic radar, millimeter wave radar, or laser radar and installed in the front of the vehicle, on both sides of the vehicle, or in the rear of the vehicle, to receive a radio wave reflected by an object around the vehicle, so that a position of the surrounding object outside the vehicle may be obtained. The surrounding information V of the vehicle may include the image outside the vehicle, the point cloud information, the reflected radio wave, or a combination of at least two thereof that is sensed by the sensor module 40. In some embodiments, the sensor module 40 may be a sensor originally mounted to the vehicle, or the plug-type driver assistance device 1 may include the sensor module 40 additionally mounted to the vehicle.

As shown in FIG. 2 and FIG. 3, in some embodiments, the processing unit 32 of the auxiliary control module 30 may obtain an outside relative value according to the surrounding information V of the vehicle. The outside relative value is a relative distance value, a relative speed value, a relative acceleration value, and a relative time to collision between a vehicle and a surrounding object, or a combination of at least two thereof. In particular, the processing unit 32 may obtain a relative position between the vehicle and the surrounding object according to the surrounding information V of the vehicle, so that the relative distance value, the relative speed value, the relative acceleration value, or the relative time to collision between the vehicle and the surrounding object may be calculated. In addition, the processing unit 32 performs processing according to the outside relative value to generate the analog pedal signal I and the analog braking signal B, to actively intervene in controlling of power output and braking, which is described below in different assist driving modes.

Figure 5:
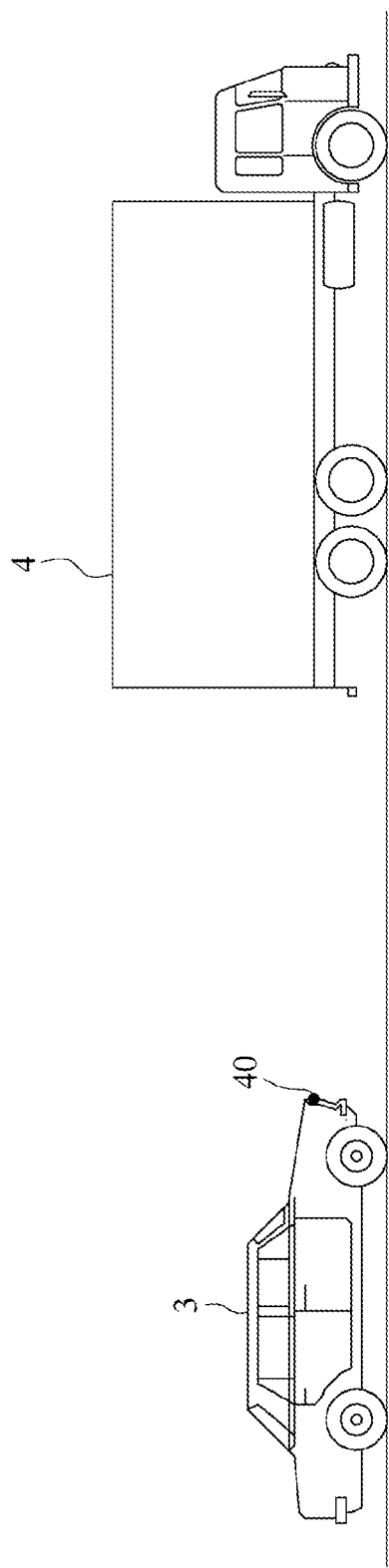
FIG. 5 illustrates a schematic diagram of application of an embodiment of a plug-type driver assistance device according to the instant disclosure.

In an embodiment, the assist driving mode may be an automatic emergency braking (AEB) mode, and the processing unit 32 obtains a front relative value according to the surrounding information V of the vehicle. The front relative value is a front relative distance value, a front relative speed value, a front relative acceleration value, and a front relative time to collision, or a combination of at least two thereof. For example, referring to FIG. 2, FIG. 3, and FIG. 5, the sensor module 40 may be disposed in front of a vehicle 3, and when there is other vehicles (a front vehicle 4 shown in FIG. 5) in front of the vehicle, the sensor module 40 may sense and obtain a relative position (that is, the surrounding information V of the vehicle) of the vehicle 3 and the front vehicle 4, and the processing unit 32 may obtain the front relative value according to the surrounding information V of the vehicle. For example, the processing unit 32 divides the relative position of the vehicle 3 and the front vehicle 4 by a relative speed of the vehicle 3 and the front vehicle 4, to obtain a front relative time to collision (TTC) between the vehicle 3 and the front vehicle 4. When the front relative value is greater than a threshold (for example, a front relative time to collision is greater than 3 seconds), the processing unit 32 remains in the original vehicle control mode, so that the original vehicle controller 11 generates a control signal according to a change of a position of the accelerator pedal 10 which the driver depresses, to control power output of the driving unit 12. When the front relative value is less than a threshold (for example, a front relative time to collision is less than 2.5 seconds), the processing unit 32 switches to the automatic emergency brake mode, to perform processing according to the surrounding information V of the vehicle to generate an analog pedal signal I and an analog braking signal B. The analog pedal signal I is a deceleration signal to control deceleration of the vehicle. The driving unit 12 as the engine is used as an example. The original vehicle controller 11 is changed to generate a control signal according to the analog pedal signal I to control the accelerator opening degree of the driving unit 12 to decrease (such as, control the accelerator opening degree to decrease to 0%) to reduce the vehicle speed.

In the embodiment of FIG. 2, the analog braking signal B includes a control signal indicating closing of the inlet valve 23 and a control signal indicating opening of the outlet valve 25, to correspondingly close the inlet valve 23 and open the outlet valve 25, and the hydraulic pump 21 of the external brake module 20 may be operated to actively increase a hydraulic pressure. In particular, since the analog braking signal B corresponds to closing of the inlet valve 23, liquid in the master cylinder 14 driven when the driver depresses the brake pedal 13 cannot flow to each wheel cylinder 15, so that brake control cannot be performed. Since the analog braking signal B corresponds to opening of each outlet valve 25, a hydraulic pressure generated by operation of the hydraulic pump 21 may flow to each wheel cylinder 15 via the outlet valve 25 through the pipeline to achieve a function of actively controlling the brake, thereby improving driving safety.

Alternatively, in another embodiment, when the front relative value is less than a threshold (for example, a front relative time to collision is less than 2.5 seconds), the analog pedal signal I corresponds to reduction of power output of the driving unit 12 to decrease a vehicle speed. The analog braking signal B includes a control signal indicating closing of the inlet valve 23 and a control signal indicating closing of the outlet valve 25 to first correspond to closing of the inlet valve 23 and closing of the outlet valve 25, and the hydraulic pump 21 is operated to first establish a hydraulic pressure inside the external brake module 20. When the front relative value is even less than another threshold (for example, a front relative time to collision is less than 2 seconds), the processing unit 32 then outputs another analog braking signal. Another analog braking signal corresponds to closing of the inlet valve 23 and opening of the outlet valve 25. In this case, the hydraulic pressure pre-established by the hydraulic pump 21 may flow to each wheel cylinder 15 via the outlet valve 25 through the pipeline to achieve the function of actively controlling the brake and increase braking force, thereby improving driving safety.

However, the foregoing embodiments are merely examples, and in other embodiments, an analog braking signal B generated and output by the processing unit 32 through processing may correspond to closing of the inlet valve 23 and closing of the outlet valve 25, so that the hydraulic pump 21 is operated to first establish a hydraulic pressure inside the external brake module 20. Then, after the hydraulic pump 21 is operated for a predetermined time (for example, 3 seconds) or after the hydraulic pressure reaches a predetermined pressure, the processing unit 32 may output another analog braking signal to correspond to closing of the inlet valve 23 and opening of the outlet valve 25, so that the hydraulic pressure pre-established by the hydraulic pump 21 can flow to each wheel cylinder 15 via the outlet valve 25 through the pipeline.

In the embodiment of FIG. 3, the analog braking signal B includes a control signal indicating opening of the air pressure valve 24 to correspond to opening of the air pressure valve 24, so that air generated by the air compressor 16 flows to each wheel cylinder 55 via a pipeline of the air pressure valve 24 to achieve the function of actively controlling the brake, thereby improving driving safety.

In another embodiment, the assist driving mode may be an adaptive cruise control (ACC) mode, and the analog pedal signal I corresponds to a predetermined vehicle speed (for example, 80 km/hr, 90 km/hr, or 100 km/hr), to achieve a cruise function, where the predetermined vehicle speed may be a cruise speed input by the driver or a safety driving speed set by a system. In the embodiment of FIG. 2, the analog braking signal B includes a control signal indicating the opening of the inlet valve 23 and a control signal indicating the opening of the outlet valve 25 to correspondingly open the inlet valve 23 and open the outlet valve 25. In the embodiment of FIG. 3, the analog braking signal B includes a control signal indicating closing of the air pressure valve 24 to correspondingly close the air pressure valve 24, so that the driver may still depress a brake.

Carrying on with the foregoing, in a cruise process, the processing unit 32 of the auxiliary control module 30 further generates an analog pedal adjustment signal according to a change of the surrounding information V of the vehicle. Power output of the driving unit 12 corresponding to the analog pedal adjustment signal is different from power output of the driving unit 12 corresponding to the analog pedal signal I. For example, referring to FIG. 2, FIG. 3, and FIG. 5, when there are other vehicles in front of the vehicle, the sensor module 40 in front of the vehicle 3 may sense and obtain a relative position (that is, the surrounding information V of the vehicle) of the vehicle 3 and the front vehicle 4, and the processing unit 32 may obtain the front relative value according to the surrounding information V of the vehicle. When the front relative value is greater than a threshold (for example, a front relative time to collision is greater than 5 seconds), the processing unit 32 continues to use the analog pedal signal I to control the driving unit 12 to operate at the predetermined vehicle speed. When the front relative value is less than a threshold (for example, a front relative time to collision is less than 3 seconds), the processing unit 32 generates an analog pedal adjustment signal and transmits the analog pedal adjustment signal to the original vehicle controller 11 via the output unit 33, to control power output of the driving unit 12 to be reduced (such as, control the accelerator opening degree of the driving unit 12 to decrease from 50% to 10%) to reduce the vehicle speed, so that a safety distance remains between the vehicle 3 and the front vehicle 4. In addition, when the processing unit 32 outputs the analog pedal adjustment signal and the front relative time to collision continuously decreases, the processing unit 32 further outputs an analog braking adjustment signal. In the embodiment of FIG. 2, the analog braking adjustment signal may correspond to closing of the inlet valve 23 and opening of the outlet valve 25, or first correspond to closing of the inlet valve 23 and closing of the outlet valve 25, and then correspond to opening of the outlet valve 25, so that the hydraulic pump 21 of the external brake module 20 is operated to actively increase the hydraulic pressure, to achieve the function of actively controlling the brake, so that a safe distance remains between the vehicle 3 and the front vehicle 4. In the embodiment of FIG. 3, the analog braking adjustment signal may correspond to opening of the air pressure valve 24, so that air generated by the air compressor 16 flows to each wheel cylinder 55 via the pipeline of the air pressure valve 24 to achieve the function of actively controlling the brake.

Figure 6:
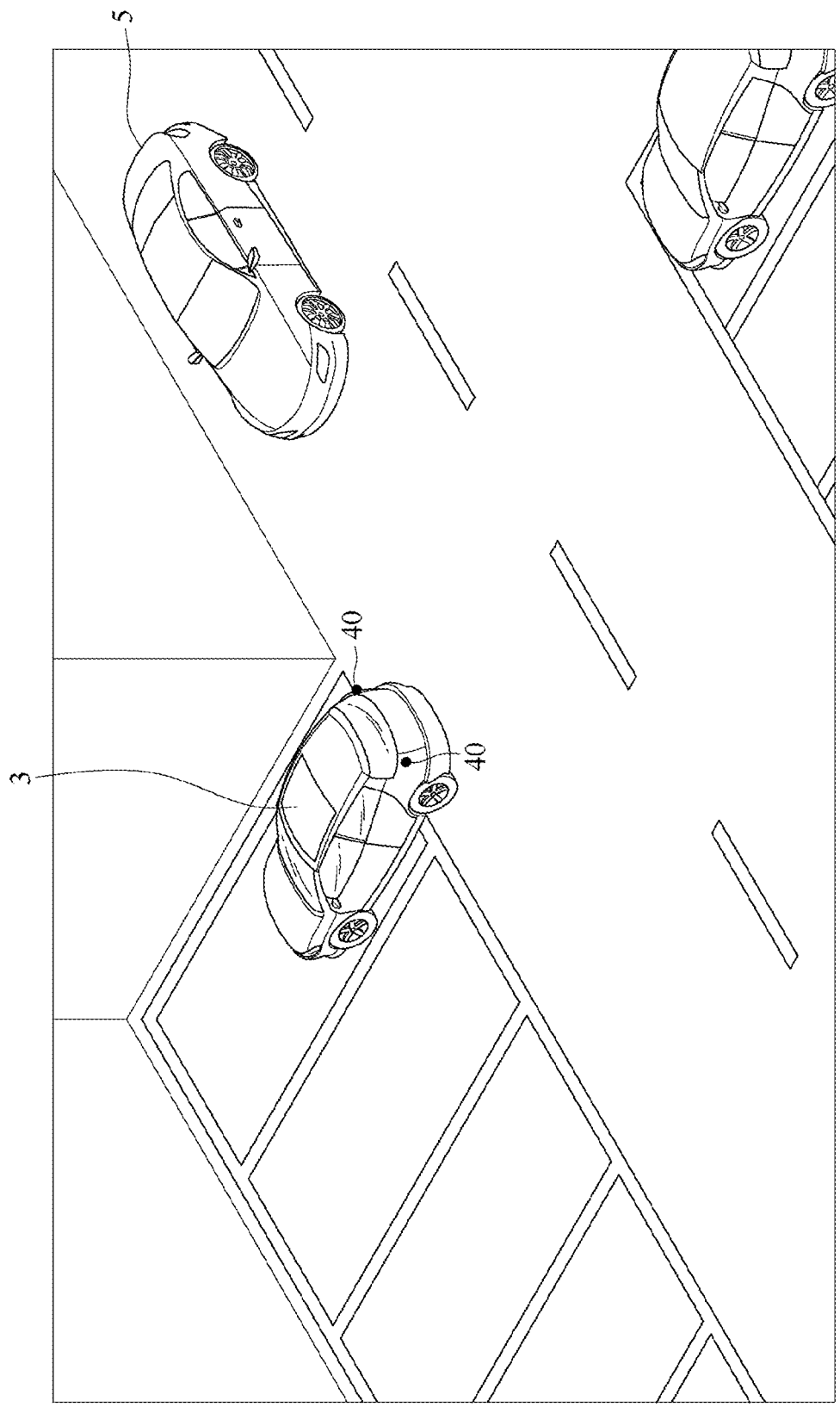
FIG. 6 illustrates a schematic diagram of application of another embodiment of a plug-type driver assistance device according to the instant disclosure.

In an embodiment, the assist driving mode may be a cross traffic assistance (CTA) mode. The processing unit 32 obtains a side relative value according to the surrounding information V of the vehicle. The side relative value is a side relative distance value, a side relative speed value, a side relative acceleration value, and a side relative time to collision, or a combination of at least two thereof. For example, referring to FIG. 2, FIG. 3, and FIG. 6, the sensor module 40 may be disposed on two sides of the vehicle 3. When the vehicle 3 passes through an intersection or leaves a parking zone, if there are other vehicles (such as a vehicle 5 on a side in FIG. 6) approaching both sides of the vehicle 3, the sensor module 40 may sense and obtain a relative position (that is, the surrounding information V of the vehicle) of the vehicle and the vehicle 5 on a side of the vehicle, and the processing unit 32 may obtain a side relative value according to the surrounding information V of the vehicle. For example, the processing unit 32 divides the relative position of the vehicle 3 and the vehicle 5 on a side of the vehicle by a relative speed of the vehicle 3 and the vehicle 5 on a side of the vehicle, to obtain a side relative time to collision (TTC) between the vehicle 3 and the vehicle 5 on a side of the vehicle. When the side relative value is greater than a threshold (for example, a side relative time to collision is greater than 3 seconds), the processing unit 32 remains in the original vehicle control mode, so that the original vehicle controller 11 generates a control signal according to a change of a position of the accelerator pedal 10 which the driver depresses, to control power output of the driving unit 12. When the side relative value is less than a threshold (for example, a side relative time to collision is less than 2.5 seconds), the processing unit 32 switches to the cross traffic assistance mode, to perform processing according to the surrounding information V of the vehicle to generate an analog pedal signal I and an analog braking signal B. The analog pedal signal I is a deceleration signal to control deceleration of the vehicle. The driving unit 12 as the engine is used as an example. The original vehicle controller 11 is changed to generate a control signal according to the analog pedal signal I to control the accelerator opening degree of the driving unit 12 to decrease (such as, control the accelerator opening degree to decrease to 0%) to reduce the vehicle speed.

In the embodiment of FIG. 2, the analog braking signal B includes a control signal indicating closing of the inlet valve 23 and a control signal indicating opening of the outlet valve 25 to correspond to closing of the inlet valve 23 and opening of the outlet valve 25, and the hydraulic pump 21 of the external brake module 20 can be operated to actively increase a hydraulic pressure, to achieve a function of actively controlling the brake, thereby improving driving safety.

Alternatively, in another embodiment, when the side relative value is less than a threshold (for example, a side relative time to collision is less than 2.5 seconds), the analog pedal signal I corresponds to decrease in power output of the driving unit 12 to reduce a vehicle speed. The analog braking signal B includes a control signal indicating closing of the inlet valve 23 and a control signal indicating closing of the outlet valve 25 to first correspond to closing of the inlet valve 23 and closing of the outlet valve 25, and the hydraulic pump 21 is operated to first establish a hydraulic pressure inside the external brake module 20. When the side relative value is less than another threshold (for example, a side relative time to collision is less than 2 seconds), the processing unit 32 then outputs another analog braking signal. Another analog braking signal corresponds to closing of the inlet valve 23 and opening of the outlet valve 25. In this case, the hydraulic pressure pre-established by the hydraulic pump 21 may flow to each wheel cylinder 15 via the outlet valve 25 through the pipeline, to achieve the function of actively controlling the brake and increase braking force, thereby improving driving safety. However, the foregoing embodiments are merely examples, and in other embodiments, after the hydraulic pump 21 is operated for a predetermined time (for example, 4 seconds) or after the hydraulic pressure reaches a predetermined pressure, the processing unit 32 may output another analog braking signal to correspond to closing of the inlet valve 23 and opening of the outlet valve 25.

In the embodiment of FIG. 3, the analog braking signal B includes a control signal indicating opening of the air pressure valve 24 to correspond to opening of the air pressure valve 24, so that air generated by the air compressor 16 flows to each wheel cylinder 55 via a pipeline of the air pressure valve 24 to achieve the function of actively controlling the brake.

However, the automatic emergency brake (AEB) mode, the adaptive cruise control (ACC) mode, or the cross traffic assistance (CTA) mode is merely an example, and the assist driving mode may also be other modes such as a pre-crash mode or a collision mitigation mode.

As shown in FIG. 2 and FIG. 3, in an embodiment, the receiving unit 31 of the auxiliary control module 30 further receives vehicle condition information C, where the vehicle condition information C may be a vehicle running state (such as a vehicle speed or a yaw rate) or an abnormal state. For example, the receiving unit 31 may be connected to an on-board diagnostics (OBD) system of the vehicle. The on-board diagnostics system may detect whether each component of the vehicle is abnormal to output the vehicle condition information C, such as an engine fault or a fuel system fault. The processing unit 32 may further perform processing according to the vehicle condition information C and the surrounding information V of the vehicle to generate an analog pedal signal I, an analog braking signal B, and an alert signal W to actively control the brake and driving unit 12. For example, when the vehicle condition information C shows that when an engine fails, the processing unit 32 switches to the auxiliary driving mode to output the analog pedal signal I, the analog braking signal B, and the alert signal W to actively control the brake and driving unit 12 to slow down the vehicle, and send a text message, a sound, or bright light to alert the driver, thereby ensuring driving safety of the driver.

Although the instant disclosure has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A plug-type driver assistance device, comprising:
    an external brake module comprising a hydraulic pump and a control valve group, the control valve group comprising an inlet valve and an outlet valve, and the hydraulic pump being in communication between the inlet valve and the outlet valve; and
    an auxiliary control module comprising a receiving unit, a processing unit, and an output unit, the processing unit being electrically connected to the receiving unit and the output unit, the output unit being electrically connected to the external brake module, the receiving unit receiving a switching signal, and the processing unit selectively switching to an original vehicle control mode or an assist driving mode according to the switching signal; wherein
    when the processing unit is in the original vehicle control mode, the processing unit receives an accelerator pedal signal via the receiving unit and controls the output unit to output the accelerator pedal signal, and
    when the processing unit is in the assist driving mode, the processing unit receives surrounding information of a vehicle via the receiving unit and generates an analog pedal signal and an analog braking signal through processing, and the processing unit controls the output unit to output the analog pedal signal and the analog braking signal, wherein the analog braking signal corresponds to closing the inlet valve, closing the outlet valve and controlling the operation of the hydraulic pump to establish hydraulic pressure first, and then the processing unit outputs another analog braking signal, the another analog braking signal corresponds to closing the inlet valve and opening the outlet valve.

2. The plug-type driver assistance device according to claim 1, wherein the assist driving mode further means that the processing unit receives the surrounding information of the vehicle via the receiving unit and generates an alert signal through processing, the processing unit controlling the output unit to output the alert signal.

3. The plug-type driver assistance device according to claim 1, wherein the surrounding information of the vehicle is from a sensor module.

4. The plug-type driver assistance device according to claim 1, wherein the receiving unit further receives vehicle condition information, and the processing unit performs processing according to the vehicle condition information and the surrounding information of the vehicle to generate the analog pedal signal and the analog braking signal.

5. The plug-type driver assistance device according to claim 1, wherein the processing unit obtains an outside relative value according to the surrounding information of the vehicle, the outside relative value being a relative distance value, a relative speed value, a relative acceleration value, and a relative time to collision between the vehicle and a surrounding object, or a combination of at least two thereof; and the processing unit performs processing according to the outside relative value to generate the analog pedal signal and the analog braking signal.

6. The plug-type driver assistance device according to claim 1, wherein the processing unit obtains a front relative value according to the surrounding information of the vehicle, the front relative value being a front relative distance value, a front relative speed value, a front relative acceleration value, and a front relative time to collision, or a combination of at least two thereof; and when the front relative value is less than a threshold, the processing unit performs processing to generate and output the analog pedal signal as a deceleration signal.

7. The plug-type driver assistance device according to claim 1, wherein the processing unit obtains a front relative value according to the surrounding information of the vehicle, the front relative value being a front relative distance value, a front relative speed value, a front relative acceleration value, and a front relative time to collision, or a combination of at least two thereof; and when the front relative value is less than a threshold, the processing unit performs processing to generate and output the analog pedal signal as a deceleration signal.

8. The plug-type driver assistance device according to claim 1, wherein the processing unit obtains a side relative value according to the surrounding information of the vehicle, the side relative value being a side relative distance value, a side relative speed value, a side relative acceleration value, and a side relative time to collision, or a combination of at least two thereof; and when the side relative value is less than a threshold, the processing unit performs processing to generate and output the analog pedal signal as a deceleration signal.

9. The plug-type driver assistance device according to claim 1, wherein the processing unit obtains a side relative value according to the surrounding information of the vehicle, the side relative value being a side relative distance value, a side relative speed value, a side relative acceleration value, and a side relative time to collision, or a combination of at least two thereof; and when the side relative value is less than a threshold, the processing unit performs processing to generate and output the analog pedal signal as a deceleration signal.

10. The plug-type driver assistance device according to claim 1, wherein the analog pedal signal generated and output by the processing unit through processing corresponds to a predetermined vehicle speed, and the analog braking signal generated and output by the processing unit through processing comprises a control signal indicating opening of the inlet valve and a control signal indicating opening of the outlet valve.

11. The plug-type driver assistance device according to claim 10, wherein the processing unit further generates an analog pedal adjustment signal according to a change of the surrounding information of the vehicle.

\* \* \* \* \*